Dec. 13, 1949

W. D. KEYS 2,491,378

TRAILER

Filed Jan. 31, 1947

INVENTOR.
WILLIAM D. KEYS.
BY
Oltsch & Knoblock
ATTORNEYS.

Dec. 13, 1949 W. D. KEYS 2,491,378
TRAILER

Filed Jan. 31, 1947 4 Sheets-Sheet 2

INVENTOR.
WILLIAM D. KEYS.
BY Oltsch & Knoblock
ATTORNEYS.

Dec. 13, 1949  W. D. KEYS  2,491,378
TRAILER
Filed Jan. 31, 1947  4 Sheets-Sheet 3
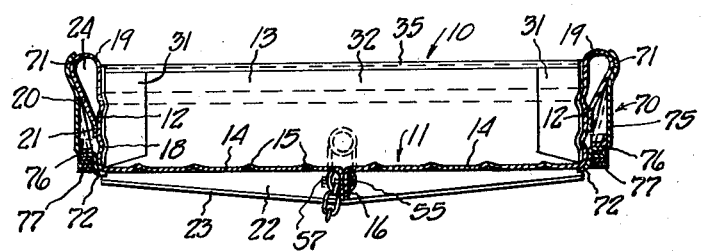
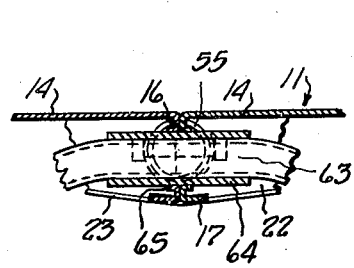
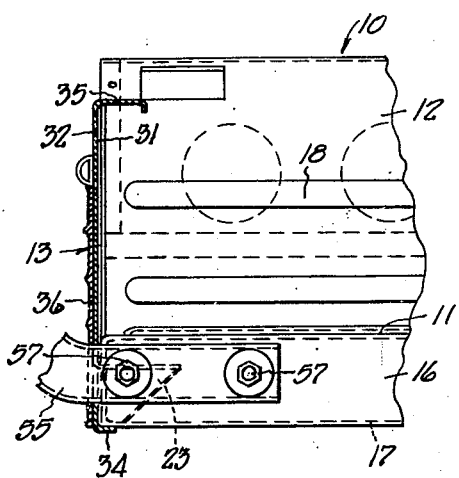
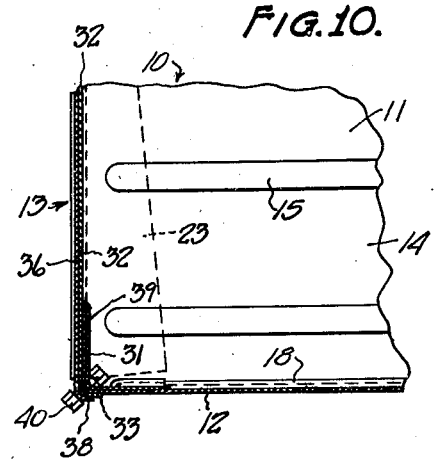
INVENTOR.
WILLIAM D. KEYS.
BY
ATTORNEYS.

Dec. 13, 1949 W. D. KEYS 2,491,378
TRAILER
Filed Jan. 31, 1947 4 Sheets—Sheet 4
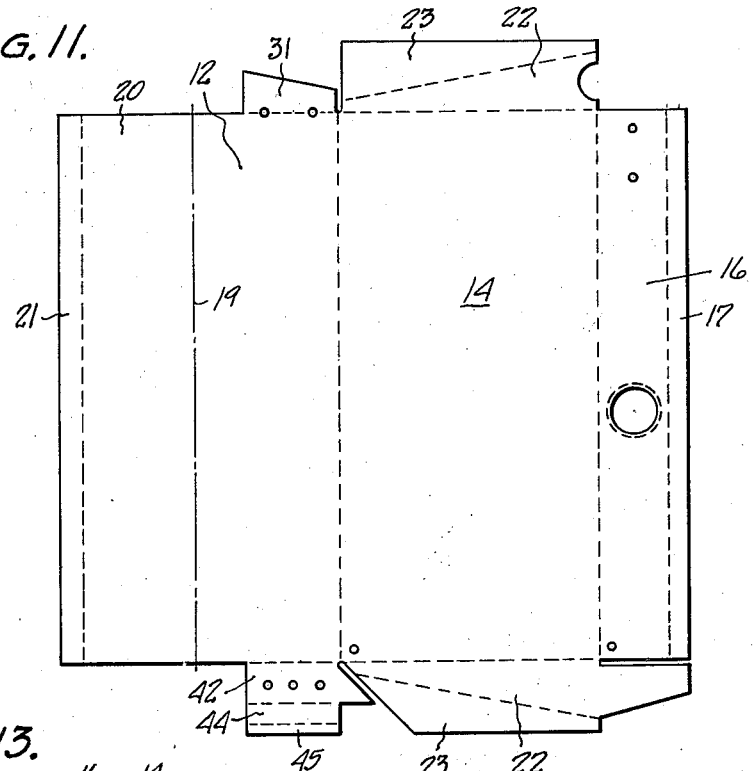
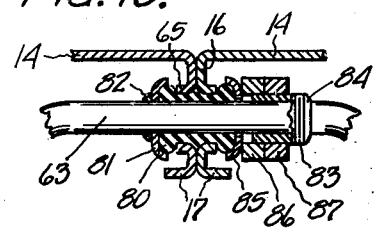
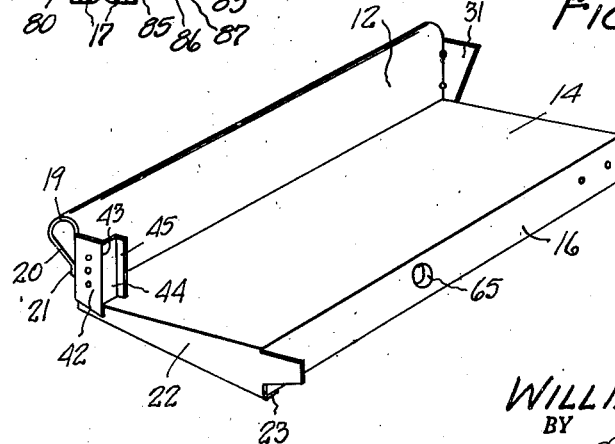
INVENTOR.
WILLIAM D. KEYS.
BY
Oltsch + Knoblock
ATTORNEYS.

Patented Dec. 13, 1949

2,491,378

UNITED STATES PATENT OFFICE 2,491,378

TRAILER

William D. Keys, Bristol, Ind.

Application January 31, 1947, Serial No. 725,544

3 Claims. (Cl. 280—33.4)

This invention relates to improvements in trailers, and more particularly to the type of trailer known as a utility trailer which is adapted to be towed by an automobile for the purpose of hauling baggage and other goods and commodities.

The primary object of the invention is to provide a strong and sturdy trailer construction which is formed entirely of sheet metal parts so shaped as to reinforce and rigidify the construction and eliminate the need for the use of frame or chassis parts independently of the sheet metal body of the trailer per se.

A further object of the invention is to provide a trailer with a novel construction for mounting the wheels which support the trailer.

A further object is to provide a device of this character having a wheel mounting axle of arched construction which is journaled at its center to the vehicle body and whose end portions are pressed upon by springs carried by the body in a manner to yieldingly connect the wheel assembly with the trailer body.

A further object of the invention is to provide a trailer body which is so constructed as to be capable of hauling heavy loads without distortion, which is reinforced at all critical and load bearing points, which is formed of a minimum number of parts, some of which are substantially interchangeable, and which is provided with reinforcing means at the points at which the wheel mounting assembly is connected with the trailer body.

Other objects will be apparent from the following specification.

In the drawing:

Fig. 6 is a vertical transverse sectional view taken on line 6—6 of Fig. 2.

Fig. 7 is a fragmentary horizontal sectional view taken on line 7—7 of Fig. 2.

Fig. 8 is a fragmentary transverse sectional view taken on line 8—8 of Fig. 2.

Fig. 9 is a fragmentary longitudinal sectional view taken on line 9—9 of Fig. 3.

Fig. 10 is a fragmentary horizontal sectional view taken on line 10—10 of Fig. 2.

Fig. 11 is a view of one of the body-forming blanks.

Fig. 12 is a perspective view of the blank in its bent form.

Fig. 13 is a view similar to Fig. 8, showing a modified construction.

Figure 1:
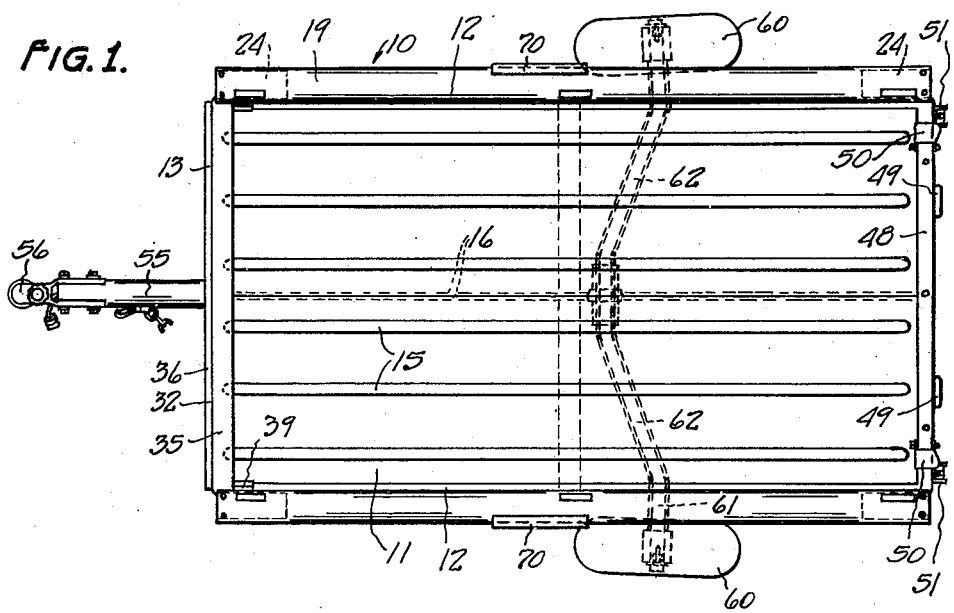
Fig. 1 is a top plan view of the trailer.

Referring to the drawing which illustrates the preferred embodiment of the invention, the numeral 10 designates the body of the trailer. The body of the trailer is formed entirely of sheet metal and has a bottom 11, side walls 12, and a front wall 13.

The bottom 11 and side walls 12 form a rigid unit which is fabricated from two complementary panels of sheet metal, as shown in Figs. 11 and 12, joined at their longitudinal inner edges. Each of these panels includes a bottom-forming portion 14 which is preferably provided with a plurality of longitudinally extending offset ribs 15 extending substantially the full length thereof and serving to reinforce, strengthen and rigidify the bottom 11. The inner margin of the body-forming panels are defined by downturned vertical flanges 16, preferably having outturned flanges 17 for at least a part of the length thereof. The flanges 16 are preferably welded in face engagement throughout their length to rigidly interconnect the two halves of the body. The body-forming panels are bent upwardly to define the side walls 12 which side walls are preferably ribbed longitudinally at 18 to strengthen and reinforce the same. The upper ends of the side walls 12 are defined by rolled portion 19 of substantial radius, and the outer margins of the body-forming panels are defined by downwardly inwardly inclined flange portions 20 which are spot welded at their lower edge portions to the outer surface of the side walls 12 at 21 intermediate the height of the side walls 12. At the ends of the bottom defining portions 14 of the body halves are formed downturned flanges 22 of substantially rectangular form which are bent horizontally inwardly along diagonal lines to define a horizontal reinforcing flange 23 at the lower edge of the parts 22. The inner edges of the flanges 22 and 23 are preferably welded to the ends of the longitudinally extending flanges 16 and 17. The ends of the rolled portions 19 at the upper edge of the side walls 12 are provided with inserts 24 for reinforcing purposes, said inserts preferably constituting wood blocks of a shape to fit snugly within the recess or opening at the roll 19 and being of a length to extend a short distance along the length of the body at the shoulders 19.

The construction of the front waoll 13 of the trailer body is best shown in Figs. 9 and 10 and entails the formation of vertical flanges 31 projecting laterally inwardly from the front edge of the side walls 12 to form an abutment for an inner sheet metal end wall panel 32 which is shaped at its lower portion with downwardly inclined opposed bottom edge portions so that it fits over and bears against the flange 22. In other words, the bottom margin of the panel 32 bears flat against the flanges 22, and the opposite ends of the panel 32 bear flat against the vertical flanges 31 projecting from the side walls 12. These parts in face engagement may be welded or otherwise fixedly secured together. The margins of the panel 32 are provided with rearwardly or inwardly turned flanges, the opposite vertical edges of the panel 32 having the flanges 33 fitting around and bearing against the outer face of the wall 12 as shown in Fig. 10. The bottom margin of the panel 32 has a rearwardly bent flange 34 which underlies the flanges 23 of the main body part. The top of the panel 32 has the rearwardly bent reinforcing flange 35 as shown in Fig. 10. A rubber sheet or panel 36 is glued or otherwise bonded in face engagement with the face of the panel 32 and serves as a stone guard. This rubber panel terminates at a height lower than the upper edge of the panel 32, and its bottom portion conforms in shape to the shape of the panel 32. The opposite side margins of the panel 36 are rearwardly flanged at 38 as shown in Fig. 10. A sheet metal angle member 39 is positioned vertically at the forward corners of the body in engagement with the side wall 12 and the inturned flange 31 and is marginally welded to the abutting parts and is also secured in place by the bolts and nuts 40 extending therethrough and through the other panel parts at the front corners of the body structure as shown in Fig. 10. It will be apparent from this construction that the vertical corners of the trailer body are very strong, being formed of multiple thicknesses of metal secured rigidly together. Thus, as best seen in Fig. 10, three thicknesses of sheet metal are provided at the vertical corners, the same constituting the angle member 39, the side wall 12 with its flange 31, and the panel 32 with its flange 33.

The construction of the corners at the rear of the trailer body is best illustrated in Fig. 7 from which it will be seen that the side walls 12 have parts 42 bent inwardly therefrom in perpendicular relation thereto and are bent inwardly again at 43 in spaced relation to the corner of the body to provide a forwardly directed portion 44 whose margin at 45 is bent inwardly to form a seat. A vertical reinforcing and rigidifying sheet metal plate 46 is welded at its inner margin to the marginal flange portion 45, and at its outer margin is bent perpendicularly to provide a flange 47 which is welded to the side wall 12 and forms a hollow corner post. Plate 46 is also welded to the bottom 11. The rear gate or panel 48 is positioned between the flanges 44 with its inner edge bearing against the terminal flanges 45 when in upright position, thereby spanning the opposite side walls 12 and serving to reinforce the rear ends thereof against inwardly directed deforming stresses. The rear gate 48 is mounted upon the hinges 49 which are secured to the flanges 22 at the rear end of the body. Suitable latches 50 may be provided upon the rear gate 48 to lock the same in its operative position. Lights 51 may be mounted upon the post structure at the opposite sides of the rear end of the trailer, and the electrical leads thereto may extend through the chamber defined between the panels 46 and 42 as shown at 52 in Fig. 7.

Figure 2:
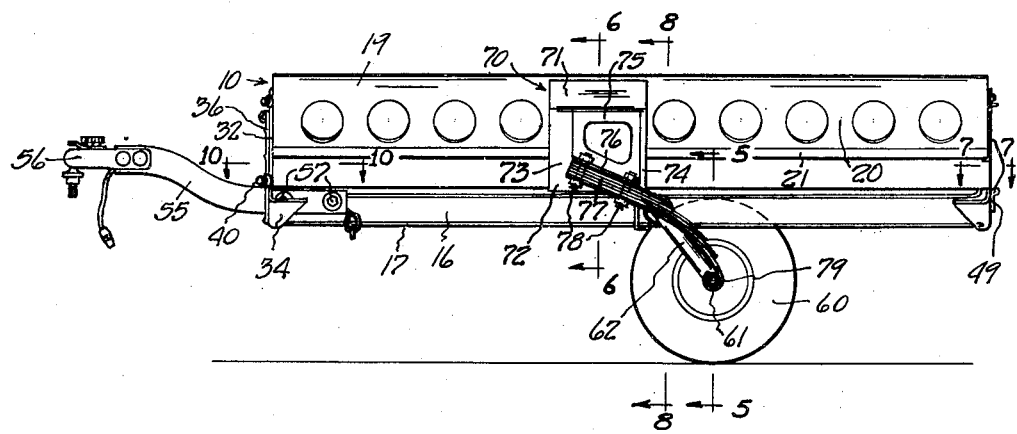
Fig. 2 is a view of the trailer in side elevation.
Figure 3:
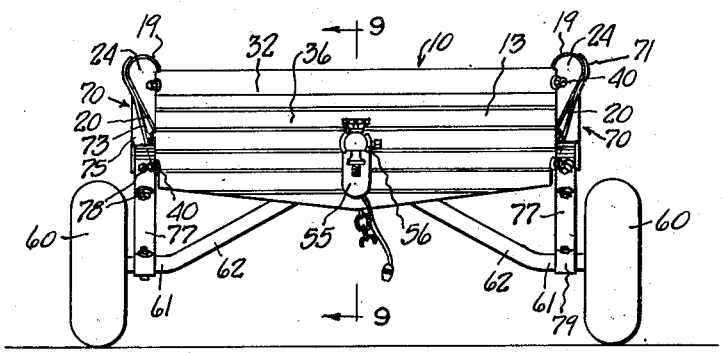
Fig. 3 is a front elevation of the trailer.
Figure 4:
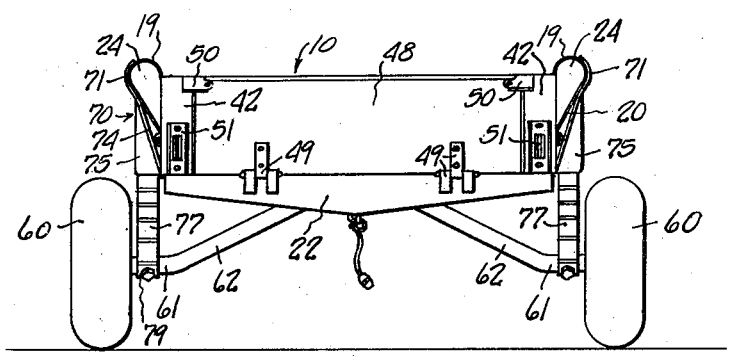
Fig. 4 is a rear elevation of the trailer.
Figure 5:
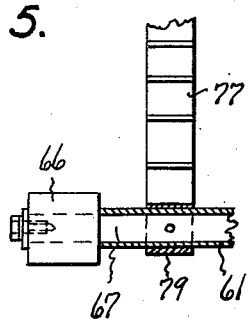
Fig. 5 is a fragmentary vertical transverse sectional view taken on line 5—5 of Fig. 2.

A drawbar 55 having a suitable trailer hitch 56 secured to its front end projects forwardly from the trailer body. This drawbar is preferably formed of tubular metal stock and extends through openings formed centrally within the front panels 32 and 36 at a level just below the bottom panel 14. The portion of the tubular member rearwardly of the front wall is slotted and fits around the flanges 16 to which it is rigidly secured by bolts 57. Where a low level utility trailer is provided as hereinshown, that is, a trailer having small wheels, it may be necessary to bend the drawbar 55, as best seen in Fig. 2, for the purpose of locating the hitch 56 at the proper elevation for connection with the hitch element mounted upon the rear bumper or other structural element of the automobile or towing vehicle in order that the bottom 14 of the trailer body may be positioned horizontally lengthwise when the trailer is hitched to the towing vehicle.

The supporting wheels 60, of which there are two, are suitably journaled upon hubs 66 carried by spindles 67 fixed in the opposite ends 61 of a rigid axle which is preferably formed of tubular material. The axle is bent into arched shape characterized by angularly disposed portions 62 projecting upwardly and forwardly from the wheel journaling end portion 61 of the axle and merging with a horizontal central axle portion 63. The central axle portion 63 is journaled within an elongated rubber sleeve 64 which is anchored in apertures in the abutting central reinforcing flanges 16. The flanges 16 preferably have portions 65 thereof surrounding the sleeve 64 rolled or flanged outwardly to form a substantial bearing surface for the sleeve 64. The sleeve 64 is held or secured to the flanges 65 surrounding the receiving opening therefor which is formed in the flanges 16. By virtue of the rotative mounting of the axle parts 63 and the sleeve 64, any vertical movement of the trailer body relative to the wheels, or vice versa, is accompanied or accommodated by twisting the rubber sleeve 64 or by longitudinally tilting of said sleeve, as will be apparent from Fig. 2. As herein shown, the vertical inclination of the parts 62 of the axle is at such an angle that the major component of such rotative movement will be its vertical component, whereby the transmission of shock due to road impact, which is transmitted through the axle from the wheels of the body, will be held at a minimum. In the preferred embodiment of the invention the axle mounting sleeve 64 will be positioned slightly rearwardly of the longitudinal center of the body, and the centers of rotation of the wheels will be positioned further to the rear of center but substantially forwardly from the rear end of the trailer body.

Fittings or brackets 70 are secured to the opposite sides 12 of the vehicle body and preferably comprise upper portions 71 which bear in face engagement with the outer portion of the side wall structure, consisting of the roll 19 and the flange 20, said portions 71 being curved as illustrated in Fig. 6 to conform to the shape of the body parts which it engages. The lower portion 72 bears in face engagement with the side wall 12 and is curved inwardly to conform to and bear against the curve defining the corner between the side panels 12 and the bottom 11. The portions 73 and 74 at the opposite ends of the fittings 70 are flat and extend at an angle to the side walls 12 and the flange 20, as best seen in Fig. 6. The intermediate portion between the parts 73 and 74 is outwardly offset and is defined by a vertical portion 75 and a shoulder portion 76 which extends inwardly from the lower end of portion 75 to the upper part of the portion 72 of the fittings 70. The shoulder portion 76 is horizontal transversely but is inclined longitudinally, as best illustrated in Fig. 2, whereby the front thereof is at a substantially higher elevation than the rear thereof. Multi-leaf cantilever springs 77 bear flat against the shoulder 76 at their forward ends and are secured and positively anchored thereto by bolts 78 or the like. The springs 76 project rearwardly and downwardly from the fittings 70 and the rear ends 79 thereof and encircle and are connected to the portions 61 of the axle adjacent to the wheel 60.

The wheel mounting above described provides a simple, effective wheel suspension. The arch or curvature of the cantilever springs 77 is correlated with the angular inclination of the portion 62 of the axle in such a manner that the lengthening of the spring incident to flexure thereof is equal to the rearward component of swinging movement of the axle so that the parts do not bind. This avoids the application of excessive torque to the axle as the same swings incident to road impact. As is best seen from Fig. 2, it will be observed that intermediate portions of the springs 77 rearwardly of the fittings 70 are positioned to substantially intersect a projection of the axis sleeve 64 which journals the axle. It will be obvious that this arrangement of the axle and the spring permits vertical components of shock due to road impact to be sustained by the springs 77. The side walls 12, which take the shock transmitted through the springs and the fittings 70, are reinforced by the roll 18 and the flange 20 in such a manner as to sustain the shock which is transmitted to the body. Note also with respect to the fittings 70 that the construction thereof distributes the shock as between the upper portions of the side walls and the lower portions thereof at the juncture of the side walls 12 with the bottom 11. This distribution of shock as applied by the fittings to the body of the trailer is of definite advantage in preventing distortion or wracking of the vehicle body.

Another construction which may be employed to connect the central portion 63 of the axle to the body is shown in Fig. 13. A rubber sleeve 80 is mounted centrally within the flanged opening 65 of the depending reinforcing rib structure formed by the flanges 16 of the bottom forming portions 14 of the body. The axle has a cup-shaped member 81 welded thereto at 82 in off-center relation to axle part 63. A sleeve 83 is welded at 84 to the axle part 63 at the opposite side of the center rib of the body, and is externally screw-threaded. A cup-shaped retainer 85 bears against the end of the sleeve 80 opposite the member 81. A nut 86 is threaded on sleeve 83 to tighten the mounting, that is, to force the member 85 against the end of the rubber sleeve 80 and thereby compress said sleeve endwise in the manner shown in Fig. 13. A lock nut 87 is also threaded on sleeve 83.

This construction possesses the same advantages as the construction shown in Fig. 8, i. e., it permits rotation of the axle and tilting thereof. Also, it prevents endwise movement of the axle. This makes a strong truss structure of the axle, body and springs, and prevents the application of lateral thrust upon the springs.

The trailer constructed as aforesaid may be formed easily from sheet metal from a small number of parts which are easily fabricated upon a brake or other metal forming machine. The construction of the parts is simple and the use of tight-crimped metal parts is avoided. All critical stress bearing portions of the trailer are adequately reinforced as are also all portions of the trailer which are subject to impact in loading or unloading the same. Another advantage of the trailer construction is that it can be positioned at a low level so that it will have a high inherent stability and will not be subject to overturning. Likewise, it will trail the tractive vehicle closely. One of the outstanding advantages of the construction is the light weight of the trailer which will reduce the tractive load upon the towing vehicle and also will make it a simple matter for an individual to manipulate the trailer by hand when the latter is disconnected from the towing vehicle. The arched axle also provides a high road clearance, which is greater at its center than at its ends, so that the trailer may travel in deep ruts without danger of scraping of the axle at the crown of the road between the ruts.

I claim:

1. A trailer comprising a body having a bottom, side walls and a central longitudinal depending rib, said rib having an aperture intermediate its ends, an arched axle extending through said aperture and inclined downwardly and rearwardly, wheels mounted on the ends of said axle, and springs connected to the end portions of said axle and to the opposite side portions of said body, and resilient means connecting said axle and rib for limited rotation and tilting of said axle.

2. A trailer comprising a body having a bottom, side walls and a central longitudinal depending rib, said rib having an aperture intermediate its ends, an arched axle extending through said aperture and inclined downwardly and rearwardly, wheels mounted on the ends of said axle, and springs connected to the end portions of said axle and to the opposite side portions of said body, said rib having a cylindrical flange encircling said axle, a resilient sleeve fitting in said flange and encircling said axle, and abutments on said axle bearing against opposite ends of said sleeve.

3. A trailer comprising a body having a bottom, side walls and a central longitudinal depending rib, said rib having an aperture intermediate its ends, an arched axle extending through said aperture and inclined downwardly and rearwardly, wheels mounted on the ends of said axle, and springs connected to the end portions of said axle and to the opposite side portions of said body, said rib having a cylindrical flange encircling said axle, a resilient sleeve fitting in said flange and encircling said axle, and abutments on said axle bearing against opposite ends of said sleeve, at least one of said abutments being adjustable longitudinally of said axle to compress said sleeve between said abutments.

WILLIAM D. KEYS.

REFERENCES CITED

The following references are of record in the file of this patent:

UNITED STATES PATENTS

| Number | Name | Date |
| --- | --- | --- |
| 1,228,138 | Rogers | May 29, 1917 |
| 1,840,599 | Nibbe | Jan. 12, 1932 |
| 2,117,401 | Cobb | May 17, 1938 |
| 2,153,237 | Clark | Apr. 4, 1939 |
| 2,187,136 | Mellinger | Jan. 16, 1940 |
| 2,198,270 | Maranville | Apr. 23, 1940 |
| 2,275,349 | Collender | Mar. 3, 1942 |
| 2,332,326 | Lex | Oct. 19, 1943 |
| 2,384,965 | Reid | Sept. 18, 1945 |
| 2,386,988 | Sullivan | Oct. 16, 1945 |
| 2,405,358 | Johnson | Aug. 6, 1946 |
| 2,438,432 | Edwards | Mar. 23, 1948 |